United States Patent
Lee et al.

(10) Patent No.: US 7,646,318 B2
(45) Date of Patent: Jan. 12, 2010

(54) H.264 CAVLC DECODING METHOD BASED ON APPLICATION-SPECIFIC INSTRUCTION-SET PROCESSOR

(75) Inventors: Jae Jin Lee, Chungcheongbuk-do (KR); Jun Young Lee, Daejeon (KR); Moo Kyoung Chung, Daejeon (KR); Seong Mo Park, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/181,769

(22) Filed: Jul. 29, 2008

(65) Prior Publication Data

US 2009/0138684 A1    May 28, 2009

(30) Foreign Application Priority Data

Nov. 26, 2007   (KR) .................... 10-2007-0120942

(51) Int. Cl.
*H03M 7/00* (2006.01)
(52) U.S. Cl. ........................................ 341/67; 341/106
(58) Field of Classification Search ................ 341/107, 341/106, 67, 65, 50, 51, 95
See application file for complete search history.

(56) References Cited

U.S. PATENT DOCUMENTS 7,135,997 B2 * 11/2006 Oh .............................. 341/106
7,423,562 B2 * 9/2008 Kim et al. ..................... 341/67
2005/0135681 A1   6/2005 Schirmer

FOREIGN PATENT DOCUMENTS

| KR | 2000-0061181 A | 10/2000 |
|---|---|---|
| KR | 10-2007-0018292 | 2/2007 |
| KR | 10-2007-0069381 | 7/2007 |

OTHER PUBLICATIONS

Tseng et al., "A Pattern-Search Method for H.264/AVC CAVLC Decoding", 2006 IEEE International Conference on Multimedia and Expo, Jul. 9-12, 2006, p. 1073-1076.
Lin et al., "An Efficient Implementation of CAVLC for H.264/AVC", Proceedings of the First International Conference on Innovative Computing, Information and Control, vol. 3, 2006, p. 601-604.
Moon, "A New Coeff-Token Decoding Method With Efficient Memory Access in H.264/AVC Video Coding Standard", IEEE Transactions on Circuits and Systems for Video Technology, vol. 17, No. 6, Jun. 2007, p. 729-736.

* cited by examiner

*Primary Examiner*—Peguy JeanPierre
(74) *Attorney, Agent, or Firm*—Rabin & Berdo, P.C.

(57) ABSTRACT

Provided is an H.264 Context Adaptive Variable Length Coding (CAVLC) decoding method based on an Application-Specific Instruction-set Processor (ASIP). The H.264 CAVLC decoding method includes determining a plurality of comparison bit strings on the basis of a table of a decoding coefficient, storing lengths of the comparison bit strings in a first register, storing code values of the comparison bit strings in a second register, comparing an input bit stream with the comparison bit strings based on the lengths and code values of the comparison bit strings, and determining value of the decoding coefficient according to a result of comparison between the input bit stream and the comparison bit strings. The method extracts a decoding coefficient using a register in an ASIP without accessing a memory and prevents a reduction in speed caused by memory access, thereby increasing the decoding speed of an H.264 decoder.

6 Claims, 5 Drawing Sheets

FIG. 2

| Run_Before | ZerosLeft | | | | | | |
|---|---|---|---|---|---|---|---|
| | 1 | 2 | 3 | 4 | 5 | 6 | >6 |
| 0 | 1 | 1 | 11 | 11 | 11 | 11 | 111 |
| 1 | 0 | 01 | 10 | 10 | 10 | 000 | 110 |
| 2 | - | 00 | 01 | 01 | 011 | 001 | 101 |
| 3 | - | - | 00 | 001 | 010 | 011 | 100 |
| 4 | - | - | - | 000 | 001 | 010 | 011 |
| 5 | - | - | - | - | 000 | 101 | 010 |
| 6 | - | - | - | - | - | 100 | 001 |
| 7 | - | - | - | - | - | - | 0001 |
| 8 | - | - | - | - | - | - | 00001 |
| 9 | - | - | - | - | - | - | 000001 |
| 10 | - | - | - | - | - | - | 0000001 |
| 11 | - | - | - | - | - | - | 00000001 |
| 12 | - | - | - | - | - | - | 000000001 |
| 13 | - | - | - | - | - | - | 0000000001 |
| 14 | - | - | - | - | - | - | 00000000001 |

FIG. 5A

```
//--------LISA Code for "drb" Instruction -----------
OPERATION drb<slot>  IN  pipe.EX
{
  DOCUMENTATION("drb")
  {
    drb(decode run-before)
  }
  CODING { 0b00101 } SYNTAX { "drb" }
BEHAVIOR
  {
    uint64 RUN_LEN=0;
    uint64 RUN_COD=0;
    uint8  vlcnum=0;
    ...
ZerosLeft =alu_in1<slot>;
    code  =alu_in2<slot>;
    if (ZerosLeft ==1) {
        RUN_LEN = 0x11000000;
        RUN_LEN = (RUN_LEN <<32)    | 0x00000000;
        RUN_COD = 0x10000000;
        RUN_COD = (RUN_COD << 32)   | 0x00000000;
    }
    ...
else if (ZerosLeft ==6) {
    RUN_LEN = 0x23333330;
    RUN_LEN = (RUN_LEN <<32)    | 0x00000000;
    RUN_COD = 0x30132540;
    RUN_COD = (RUN_COD <<32)    | 0x00000000;
    }
    ...
    else { // ZerosLeft > 6
    RUN_LEN = 0x33333334;
    RUN_LEN = (RUN_LEN <<32)    | 0x56789AB0;
    RUN_COD = 0x76543211;
    RUN_COD = (RUN_COD << 32)   | 0x11111110;
    }
  //search algorithm begins
    for ( i=0; i <16 ; i++) {
       tab_len  = RUN_LEN >> (60- (i <<2)) & 0xf;
       tab_code = RUN_COD >> (60- (i <<2)) & 0xf;
       tmp_code = code >> (32-tab_len);
       if (tab_len !=0) {
           if (tab_code == tmp_code){
              result = (tab_len <<4) | i;
            }
        }
    }
//search algorithm ends
    alu_out<slot>=result;
  }
}
```

FIG. 5B

```
//------- Inline Assembly and C Code -------
asm int drb_asm(unsigned char ZerosLeft, unsigned int code)
{@[.barrier]
   drb @{},@{ZerosLeft},@{code}
}
...
retval_drb=drb_asm(ZerosLeft,code);
value1 = retval_drb &0xf;
Value2 = (retval_drb >>4)&0xf;
...
```

H.264 CAVLC DECODING METHOD BASED ON APPLICATION-SPECIFIC INSTRUCTION-SET PROCESSOR

CROSS-REFERENCE TO RELATED APPLICATION

This application claims priority to and the benefit of Korean Patent Application No. 2007-120942, filed Nov. 26, 2007, the disclosure of which is incorporated herein by reference in its entirety.

BACKGROUND

1. Field of the Invention

The present invention relates to a method of performing H.264 Context Adaptive Variable Length Coding (CAVLC) decoding, and more particularly, to an H.264 CAVLC decoding method based on an Application-Specific Instruction-set Processor (ASIP).

This work was supported by the IT R&D program of MIC/IITA. [2007-S-026-01, Multi-Format Multimedia SoC based on MPcore Platform].

2. Discussion of Related Art

H.264 is a new video compression standard designed to efficiently and stably perform encoding and support transmission of a quadrangle video screen. Due to a high compression ratio and high reliability, H.264 is currently considered as a next-generation video compression technology all over the world. In particular, the H.264 standard is expected to be combined with a next-generation service, such as satellite Digital Multimedia Broadcasting (DMB), etc., and applied to high-definition video compression, video transmission via the Internet or a cable modem, digital data broadcasting, next-generation portable telephony, and so on.

H.264 coding methods are roughly classified into CAVLC and Context-Adaptive Binary Arithmetic Coding (CABAC). Currently, H.264 baseline profile uses CAVLC, and H.264 main profile uses both CAVLC and CABAC.

In brief, a CAVLC decoding process may be divided into three steps. The first step obtains a TrailingOnes value and a TotalCoefficient value with respect to a 4×4 block to estimate the form of the block. The second step obtains a TotalZero value. The last step calculates a Run_Before value to restore the 4×4 block data.

Meanwhile, an ASIP is a programmable processor in which high performance of an integrated circuit is combined with flexibility of a general-purpose processor. The flexibility of an ASIP enables a single chip to support various video codecs such as VC-1, H.264, Motion Picture Experts Group (MPEG), and so on. Thus, the ASIP is expected to be an effective solution for implementing a next-generation video standard requiring high throughput and a large amount of computation.

However, most conventional CAVLC decoding methods relate to efficiently searching a plurality of CAVLC tables and efficiently accessing a memory in order to implement an H.264 decoder using software or hardware. The methods have a drawback in that decoding speed decreases due to memory access. In addition, the conventional CAVLC decoding methods are not suited to the case in which CAVLC decoding is performed on an ASIP synthetically implementing software and hardware.

SUMMARY OF THE INVENTION

The present invention is directed to providing a Context Adaptive Variable Length Coding (CAVLC) decoding method that can extract coefficients used for CAVLC decoding without accessing a memory and is appropriate for CAVLC decoding using an Application-Specific Instruction-set Processor (ASIP).

One aspect of the present invention provides an H.264 CAVLC decoding method based on an ASIP, comprising: determining a plurality of comparison bit strings on the basis of a table of a decoding coefficient; storing lengths of the comparison bit strings in a first register; storing code values of the comparison bit strings in a second register; comparing an input bit stream with the comparison bit strings based on the lengths and code values of the comparison bit strings; and determining value of the decoding coefficient according to a result of comparison between the input bit stream and the comparison bit strings.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 2 shows a Run_Before table specified in the H.264 standard;

FIG. 5A shows a Language for Instruction-set Architecture (LISA) code of an ASIP instruction implementing a CAVLC decoding method according to an exemplary embodiment of the present invention, and FIG. 5B shows an exemplary embodiment of a C code implementing an application program using the ASIP instruction of FIG. 5A.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
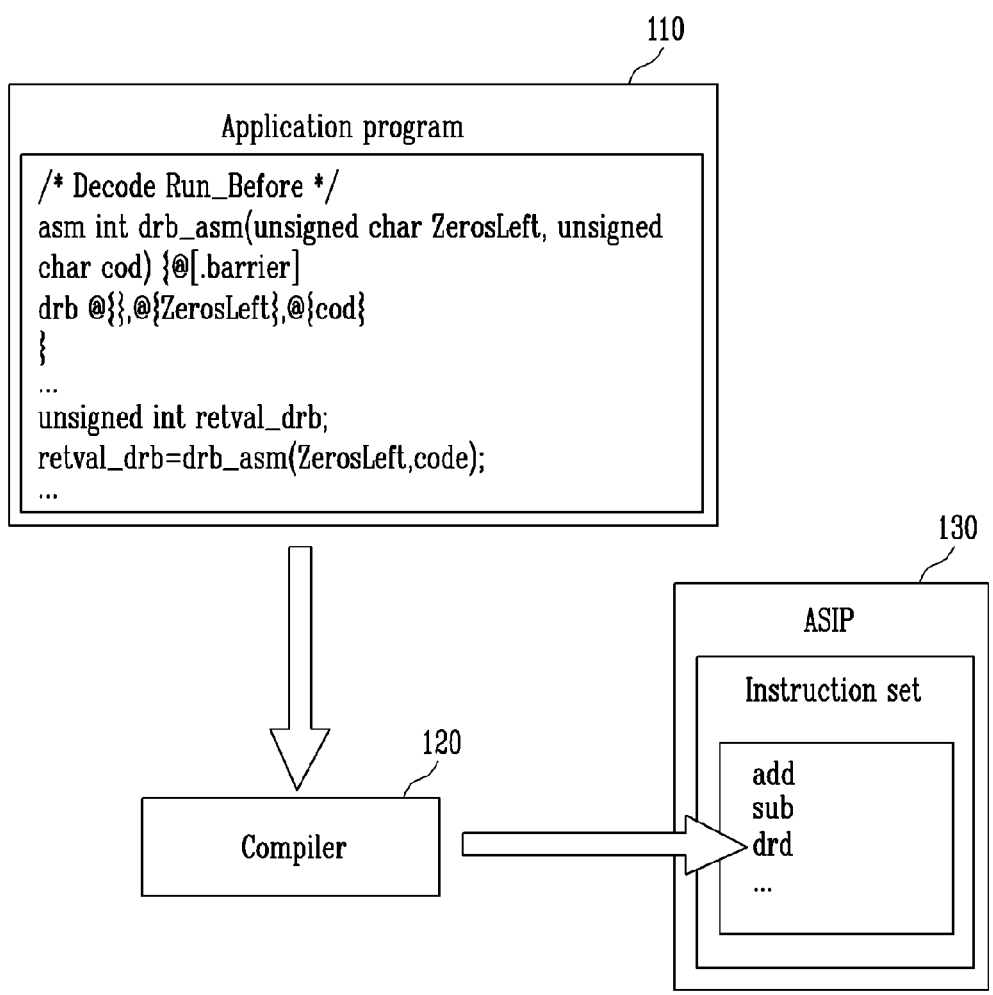
FIG. 1 is a conceptual diagram of an environment in which a Context Adaptive Variable Length Coding (CAVLC) decoding method according to an exemplary embodiment of the present invention is performed.

FIG. 1 is a conceptual diagram of an environment in which a Context Adaptive Variable Length Coding (CAVLC) decoding method according to an exemplary embodiment of the present invention is performed.

Referring to FIG. 1, an Application-Specific Instruction-set Processor (ASIP) 130 includes a drb instruction that is an instruction for decoding a Run_Before value. To calculate the Run_Before value, an application program 110 calls an assembly function drb_asm to execute the drb instruction included in the ASIP 130. The assembly function drb_asm in C codes implementing the application program 110 may be mapped with the drb instruction of the ASIP 130 by a compiler 120 specialized for the ASIP.

FIG. 2 shows a Run_Before table specified in the H.264 standard.

Referring to FIG. 2, a Run_Before value has context adaptiveness and thus is determined differently according to a ZerosLeft value with respect to even the same bit string. Therefore, to extract a Run_Before value, a ZerosLeft value as well as an input bit stream input to a decoder must be considered together.

Meanwhile, a bit string encoded using Variable Length Coding (VLC) may be expressed by a pair of a length and a code value of the bit string as (Length, Code). For example, "00001" that is a bit string whose Run_Before value is determined to be 8 when a ZerosLeft value is larger than 6, may be expressed by (5, 1).

Figure 3:
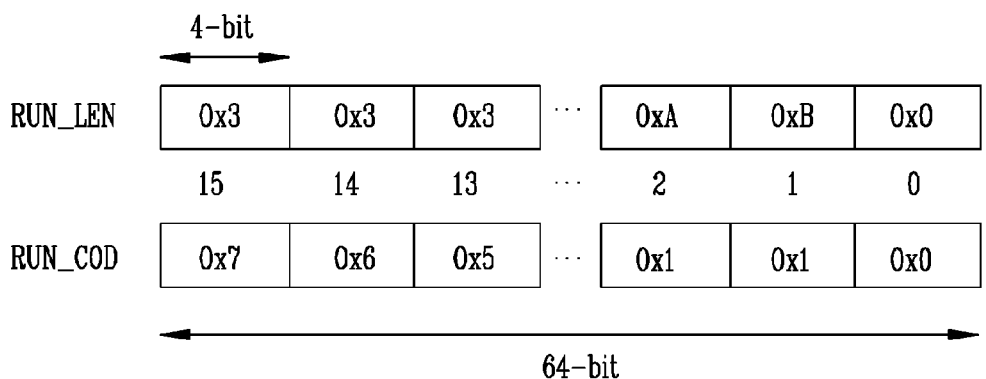
FIG. 3 illustrates formats of a RUN_LEN register and a RUN_COD register defined in an Application-Specific Instruction-set Processor (ASIP) based on a CAVLC decoding method according to an exemplary embodiment of the present invention.

FIG. 3 illustrates formats of a RUN_LEN register and a RUN_COD register defined in an ASIP based on a CAVLC decoding method according to an exemplary embodiment of the present invention.

Referring to FIG. 3, the RUN_LEN register and the RUN_COD register store lengths and code values of bit strings constituting a column of a Run_Before table selected according to a ZerosLeft value, respectively.

For example, when a ZerosLeft value is larger than 6, bit strings corresponding to Run_Before values of 0 to 14 are expressed by (Length, Code) as shown in a table below.

| | Run_Before | | | | |
|---|---|---|---|---|---|
| | 0 | 1 | 2 | ... | 13 | 14 |
| (Length, Code) | (3, 7) | (3, 6) | (3, 5) | ... | (10, 1) | (11, 1) |

Since lengths and code values included in the above table do not exceed 15, lengths and code values of bit strings corresponding to Run_Before values of 0 to 14 are stored in the RUN_LEN register and the RUN_COD register in 4-bit units in sequence. More specifically, a length of 3 and a code value of 7 of a bit string corresponding to a Run_Before value of 0 are stored in the uppermost four bits of the RUN_LEN register and the RUN_COD register, respectively. As Run_Before increases from 1 to 14, a length and a code value of bit string corresponding to each Run_Before value are stored in next four bits. In addition, each 4-bit section left after storing lengths and code values stores 0 to indicate that there is no data of a bit string in the section.

In a process of extracting a Run_Before value, the ASIP compares an input bit stream with a bit string on the basis of lengths and code values stored according to the above format. When a comparison bit string is searched from the input bit stream, the ASIP may select a Run_Before value corresponding to the bit string as a decoding coefficient for performing CAVLC decoding. Therefore, a CAVLC decoding application program extracts a Run_Before value using an ASIP without accessing a memory and thus can prevent a decrease in a CAVLC decoding speed caused by memory access.

In FIGS. 1 to 3, among all decoding coefficients used for CAVLC decoding Run_Before is used as an example. However, the same method can be applied to other decoding coefficients such as TrailingOnes, TotalCoefficient and TotalZero. More specifically, lengths and code values of the corresponding bit strings selected from respective tables of TrailingOnes, TotalCoefficient and TotalZero according to a specific condition are stored in the RUN_LEN register and the RUN_COD register according to the format, and then an input bit stream is compared with the bit strings using the lengths and code values stored in the registers, such that the corresponding decoding coefficient can be efficiently extracted.

Figure 4:
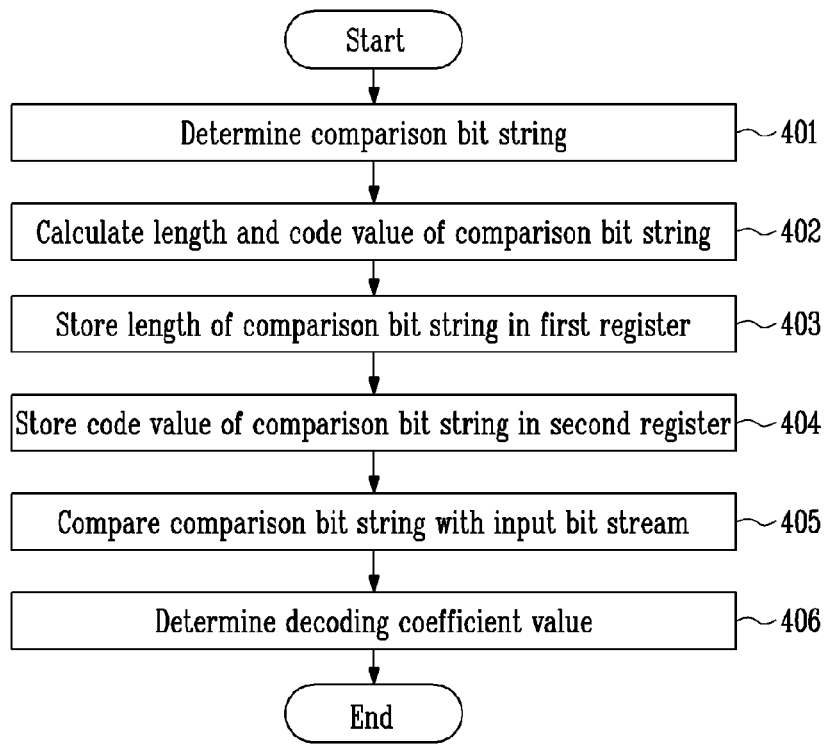
FIG. 4 is a flowchart showing a CAVLC decoding method according to an exemplary embodiment of the present invention.

FIG. 4 is a flowchart showing a CAVLC decoding method according to an exemplary embodiment of the present invention.

Referring to FIG. 4, an ASIP determines bit strings to be compared with an input bit stream from a table of a decoding coefficient used for CALVC decoding according to a specific condition (step 401), and calculates lengths and code values of the determined comparison bit strings (step 402). Here, a decoding coefficient used for CAVLC decoding may be TrailingOnes, TotalCoefficient, TotalZero, Run_Before and so on. For example, when a decoding coefficient is Run_Before, a column of a Run_Before table is determined according to a ZerosLeft value, and bit strings included in the column are determined as comparison bit strings to be compared with the input bit stream.

Subsequently, lengths of the determined comparison bit strings are stored in a first register (step 403), and code values of the comparison bit strings are stored in a second register (step 404). Here, the lengths and code values of the comparison bit strings are stored in the registers in ascending order or descending order of decoding coefficient values corresponding to the comparison bit strings, such that the ASIP can calculate a decoding coefficient value on the basis of addresses in the registers storing the bit strings in the following comparison step.

After the lengths and code values are stored, the ASIP compares the input bit stream with the comparison bit strings on the basis of the lengths and code values stored in the first and second registers (step 405). For example, the ASIP may compare upper bits of the input bit stream corresponding to the lengths of the comparison bit strings with the code values of the comparison bit strings, thereby efficiently performing the comparison step.

When a comparison bit string is searched from the input bit stream in the comparison step, the ASIP determines a decoding coefficient value on the basis of a register address storing the bit string (step 406). For example, in FIG. 3, Run_Before values of 0 to 14 correspond to register addresses of 15 to 1. In other words, when a comparison bit string positioned at a register address of i is searched from an input bit stream, a Run_Before value may be determined to be (15−i).

FIG. 5A shows a Language for Instruction-set Architecture (LISA) code of an ASIP instruction implementing a CAVLC decoding method according to an exemplary embodiment of the present invention, and FIG. 5B shows an exemplary embodiment of a C code implementing an application program using the ASIP instruction of FIG. 5A.

Referring to FIG. 5A, in the LISA code of a drb instruction extracting a Run_Before value, lengths and code values of the corresponding bit strings are stored in a 64-bit RUN_LEN register and a 64-bit RUN_COD register according to a ZerosLeft value.

Subsequently, a search algorithm shifts data stored in the RUN_LEN register and the RUN_COD register to the right by (60−(i<<2)) bits, that is, (60−(i*4)) bits, and masks the shifted data with a hexadecimal of 0xf, thereby storing the data in tab_len and tab_code. Therefore, as i increases, upper 4-bit values stored in the RUN_LEN register and the RUN_COD register are stored in tab_len and tab_code in sequence. Here, tab_len and tab_code denote lengths and code values of the bit string corresponding to a Run_Before value i according to the register format of FIG. 3. A code storing an input bit stream received from an application program is shifted to the right by (32-tab_len) bits and stored in temp_code. This means that tab_len upper bits of the input bit stream are stored in temp_code. When tab_code is equal to temp_code, tab_len and a Run_Before value, i.e., i, corresponding to the corresponding bit string are output as results. The LISA code is modeled after an ASIP using Processor Designer of CoWare company, and CoSy Express design tool is used as a compiler.

Referring to FIG. 5B, the C code implementing an application program calls an asm int drb_asm function to calculate a Run_Before value, thereby executing a drb instruction of an ASIP.

The present invention extracts a decoding coefficient using a register in an ASIP without accessing a memory, and prevents a reduction in speed caused by memory access, thereby increasing the decoding speed of an H.264 decoder.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An H.264 Context Adaptive Variable Length Coding (CAVLC) decoding method based on an Application-Specific Instruction-set Processor (ASIP), comprising:

determining a plurality of comparison bit strings on the basis of a table of a decoding coefficient;

storing lengths of the comparison bit strings in a first register;

storing code values of the comparison bit strings in a second register;

comparing an input bit stream with the comparison bit strings based on the lengths and code values of the comparison bit strings; and determining value of the decoding coefficient according to a result of comparison between the input bit stream and the comparison bit strings.

2. The H.264 CAVLC decoding method of claim 1, further comprising:

calculating the lengths and the code values of the comparison bit strings before storing the lengths of the comparison bit strings.

3. The H.264 CAVLC decoding method of claim 1, wherein the lengths and the code values of the comparison bit strings are stored in the first register and the second register in ascending order or descending order of decoding coefficient values corresponding to the comparison bit strings, respectively.

4. The H.264 CAVLC decoding method of claim 1, wherein, in the comparing the input bit stream with the comparison bit strings, upper bits of the input bit stream corresponding to the lengths of the comparison bit strings are compared with the code values of the comparison bit strings.

5. The H.264 CAVLC decoding method of claim 1, wherein, in the determining the value of the decoding coefficient, the value of the decoding coefficient is calculated based on addresses of the first register and the second register storing the comparison bit strings.

6. The H.264 CAVLC decoding method of claim 1, wherein the decoding coefficient includes TrailingOnes, TotalCoefficient, TotalZero and Run_Before.

* * * * *